(12) United States Patent
Featonby et al.

(10) Patent No.: US 10,652,094 B2
(45) Date of Patent: May 12, 2020

(54) NETWORK TRAFFIC MANAGEMENT FOR VIRTUALIZED GRAPHICS DEVICES

(71) Applicant: Amazon Technologies, Inc., Seattle, WA (US)

(72) Inventors: Malcolm Featonby, Sammamish, WA (US); Mihir Sadruddin Surani, Seattle, WA (US); Umesh Chandani, Seattle, WA (US); Adithya Bhat, Seattle, WA (US); Yuxuan Liu, Seattle, WA (US); Douglas Cotton Kurtz, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/265,807

(22) Filed: Feb. 1, 2019

(65) Prior Publication Data

US 2019/0173759 A1 Jun. 6, 2019

Related U.S. Application Data

(63) Continuation of application No. 15/374,509, filed on Dec. 9, 2016, now Pat. No. 10,200,249.

(51) Int. Cl.
*H04L 12/24* (2006.01)
*G06F 9/455* (2018.01)
(Continued)

(52) U.S. Cl.
CPC ...... *H04L 41/0893* (2013.01); *G06F 9/45558* (2013.01); *H04L 41/0816* (2013.01);
(Continued)

(58) Field of Classification Search
CPC ..... H04L 43/0811; H04L 45/74; H04L 67/42; G06F 2009/45595; G06F 9/5088; G06F 9/45558
See application file for complete search history.

(56) References Cited

U.S. PATENT DOCUMENTS 9,069,622 B2 6/2015 Post et al.
9,098,323 B2 8/2015 Mitra et al.
(Continued)

FOREIGN PATENT DOCUMENTS

WO 2014100558 6/2014

OTHER PUBLICATIONS

U.S. Appl. No. 14/822,511, filed Aug. 10, 2015, Nicholas Patrick Wilt et al.
(Continued)

*Primary Examiner* — Lashonda T Jacobs
(74) *Attorney, Agent, or Firm* — Robert C. Kowert; Kowert, Hood, Munyon, Rankin & Goetzel, P.C.

(57) ABSTRACT

A determination is made that network access between a virtualized graphics device and a compute instance of a client is to be enabled. A source network address for graphics-related traffic of the compute instance is identified. From a range of source port numbers associated with the source network address, a particular source port number which is unused is found. Routing metadata is transmitted to one or more routing devices indicating that a key based at least in part on (a) the source network address and (b) the particular source port number is to be used to identify a route for network packets from the first application compute instance to a virtualized graphics device.

19 Claims, 9 Drawing Sheets

(51) Int. Cl.
*H04L 12/715* (2013.01)
*G06F 9/50* (2006.01)
*H04L 12/26* (2006.01)
*H04L 12/741* (2013.01)
*H04L 29/06* (2006.01)

(52) U.S. Cl.
CPC .............. *H04L 41/12* (2013.01); *H04L 45/64* (2013.01); *G06F 9/5088* (2013.01); *G06F 2009/45595* (2013.01); *H04L 43/0811* (2013.01); *H04L 45/74* (2013.01); *H04L 67/42* (2013.01)

(56) References Cited

U.S. PATENT DOCUMENTS

| | | | |
|---|---|---|---|
| 9,904,973 B2* | 2/2018 | Wilt | G06T 1/20 |
| 9,904,974 B2* | 2/2018 | Wilt | G06F 9/45558 |
| 2007/0033156 A1 | 2/2007 | Limpert et al. | |
| 2010/0131669 A1* | 5/2010 | Srinivas | G06F 9/5044 709/233 |
| 2011/0083131 A1 | 4/2011 | Pirzada et al. | |
| 2011/0102443 A1 | 5/2011 | Dror et al. | |
| 2011/0126110 A1* | 5/2011 | Vilke | G06F 9/54 715/736 |
| 2011/0134111 A1 | 6/2011 | Stone | |
| 2011/0182422 A1 | 7/2011 | Anderson et al. | |
| 2012/0069032 A1 | 3/2012 | Hansson et al. | |
| 2012/0154389 A1 | 6/2012 | Bohan et al. | |
| 2013/0057560 A1* | 3/2013 | Chakraborty | G06F 9/455 345/520 |
| 2014/0055466 A1 | 2/2014 | Petrov et al. | |
| 2014/0169471 A1 | 6/2014 | He | |
| 2014/0176583 A1* | 6/2014 | Abiezzi | G06T 1/20 345/522 |
| 2014/0181806 A1 | 6/2014 | Abiezzi et al. | |
| 2014/0215462 A1 | 7/2014 | Kuo et al. | |
| 2014/0286390 A1 | 9/2014 | Fear | |
| 2015/0067672 A1 | 3/2015 | Mitra et al. | |
| 2015/0097844 A1 | 4/2015 | Wankhede et al. | |
| 2015/0105148 A1 | 4/2015 | Consul et al. | |
| 2015/0116335 A1* | 4/2015 | Chen | G06T 1/20 345/520 |
| 2015/0127831 A1* | 5/2015 | Kim | H04L 67/125 709/225 |
| 2015/0194136 A1* | 7/2015 | Diard | G06F 9/45533 345/547 |
| 2015/0220354 A1 | 8/2015 | Nair | |
| 2015/0221063 A1 | 8/2015 | Kim et al. | |
| 2015/0370589 A1 | 12/2015 | Bidarkar et al. | |
| 2015/0370620 A1 | 12/2015 | Lai et al. | |
| 2015/0371355 A1* | 12/2015 | Chen | G06T 1/20 345/505 |
| 2016/0239333 A1 | 8/2016 | Cowperthwaite et al. | |
| 2016/0247248 A1 | 8/2016 | Ha et al. | |
| 2017/0054987 A1* | 2/2017 | Rangarajan | H04N 19/167 |
| 2017/0279927 A1* | 9/2017 | Ramareddy | H04L 43/0811 |

OTHER PUBLICATIONS

U.S. Appl. No. 14/938,457, filed Nov. 11, 2015, Nicholas Patrick Wilt et al.
U.S. Appl. No. 14/938,461, filed Nov. 11, 2015, Nicholas Patrick Wilt et al.
U.S. Appl. No. 14/938,654, filed Nov. 11, 2015, Nicholas Patrick Wilt et al.
U.S. Appl. No. 15/178,292, filed Jun. 9, 2016, Nicholas Patrick Wilt.
U.S. Appl. No. 15/177,255, filed Jun. 8, 2016, Nicholas Patrick Wilt.
U.S. Appl. No. 15/177,262, filed Jun. 8, 2016, Nicholas Patrick Wilt.
U.S. Appl. No. 15/249,150, filed Aug. 26, 2016, Gianpaolo Ingegneri.
U.S. Appl. No. 14/938,656, filed Nov. 11, 2015, Nicholas Patrick Wilt et al.
Nice, "DCV Administration Guide," Nice s.r.l, Asti, Italy, Jul. 2015, Source: https://www.nice-software.com/download/nice-dcv-2014#documentation, pp. 1-96.
Federico Silla. "The rCUDA technology: an inexpensive way to improve the performance of GPU-based clusters." Talk at Computer Engineering Laboratory, Delft University of Technology. Delft, Netherlands. Apr. 2015, pp. 1-47.
Antonio J. Pena, et al., "A Complete and Efficient CUDA-Sharing Solution for HPC Clusters", Sep. 2, 2014, Retrieved from the Internet: URL: http://www.mcs.anl.gov/papers/P5137-0514.pdf, pp. 1-28.
U.S. Appl. No. 15/417,064, filed Jan. 26, 2017, Featonby, et al.
U.S. Appl. No. 15/439,751, filed Feb. 22, 2017, Surani, et al.
Jeff Weiss, et al., "NVIDIA Grid VCPU Deployment Guide for VMWARE Horizon 6.1", NVIDIA TechPub, Mar. 1, 2015, Retrieved from URL: http://www.vmware.com/content/dam/digitalmarketing/vmware/en/pdf/products/horizon/grid-vgpu-deployement-guide.pdf, pp. 1-14.
Shinpei Kato, et al., "GDEV: First-Class GPU Resource Management in the Operating System", Jun. 1, 2012, Retrieved from URL: https://www.usenix.org/system/files/conference/atc12/atc12-final1319.pdf, pp. 1-12.
Mark Panahi, et al., "A Framework for Real-Time Service-Oriented Architecture", 2009 IEEE Conference on Commerce and Enterprise Computing (CED '09), Jul. 20, 2009, pp. 460-467.
Matthew Danish, et al., "Virtual-CPU Scheduling in the Quest Operating System", 2011 17th IEEE Real-Time and Embedded Technology and Application Symposium, Apr. 11, 2011, pp. 169-179.
Marcos D. Assuncao, et al., "CloudAffinity: A Framework for Matching Servers to Cloudmates", 2012 IEEE Network Operations and Management Symposium (NOMS 2012), Apr. 16-20, 2012, pp. 213-220.
Lin Shi, et al., "vCUDA: GPU-Accelerated High-Performance Computing in Virtual Machines", IEEE Transaction on Computers, vol. 61, No. 6, Jun. 2012, pp. 804-816.
Installing VMware Vgpu on vSphere 6.0, Martijin Smit, Mar. 7, 2015, pp. 1-10.
U.S. Appl. No. 15/470,821, filed Mar. 27, 2017, Malcolm Featonby, et al.

* cited by examiner

NETWORK TRAFFIC MANAGEMENT FOR VIRTUALIZED GRAPHICS DEVICES

This application is a continuation of U.S. patent application Ser. No. 15/374,509, filed Dec. 9, 2016, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner. For some applications implemented using virtual machines, specialized processing devices may be appropriate for some of the computations performed—e.g., some algorithms may require extensive manipulation of graphical data.

Figure 1:
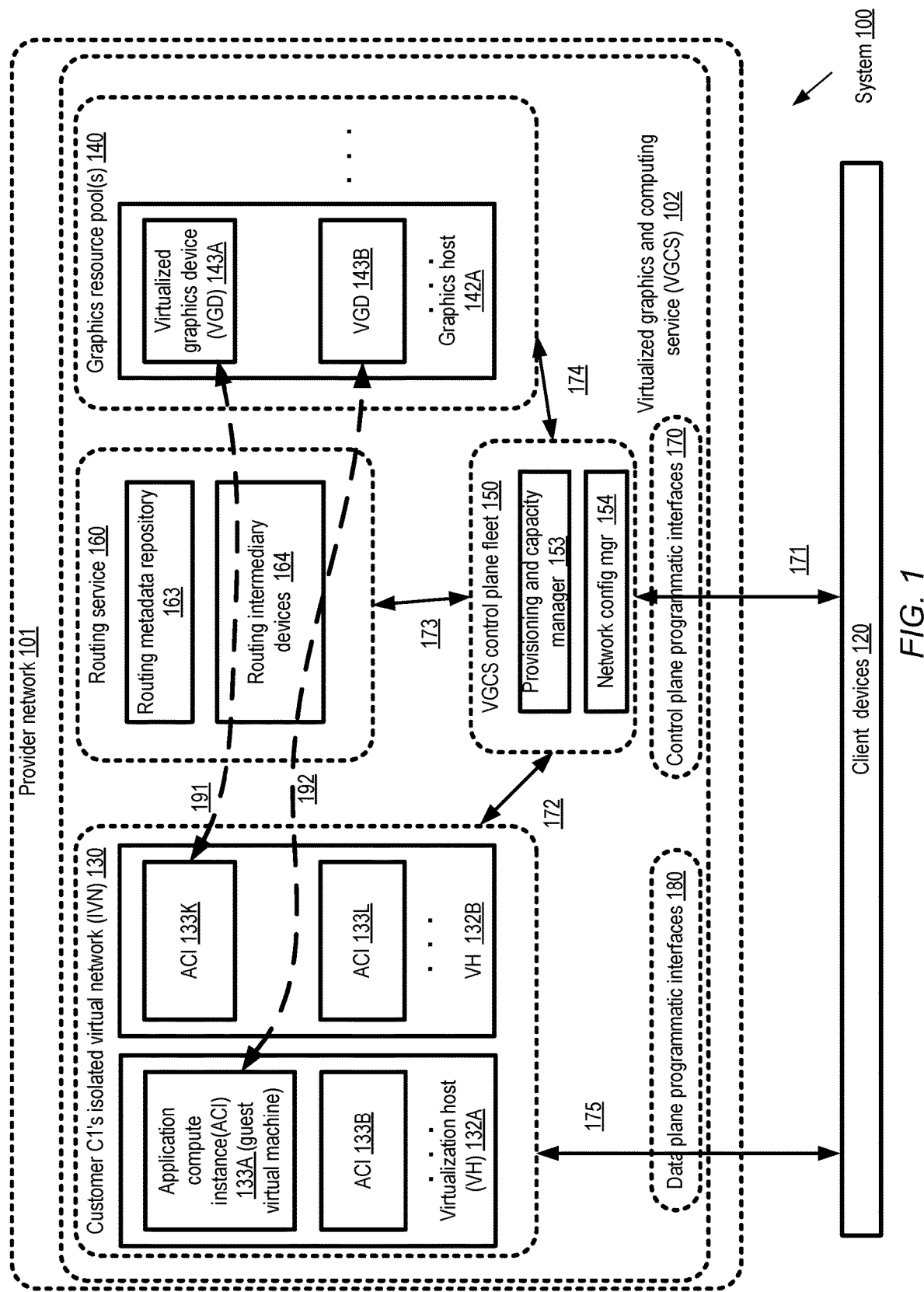
FIG. 1 illustrates an example system environment for virtualizing graphics processing in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for managing the routing of network traffic between virtual machines and remote virtualized graphics devices are described. According to one embodiment, a network-accessible virtualized graphics and computing service (VGCS) may implement programmatic interfaces enabling clients to request allocation and instantiation of guest virtual machines which can be used to execute applications. Such guest virtual machines may also be referred to as "application compute instances" in various embodiments. Some of the applications of the clients may include substantial amounts of graphics-related processing—e.g., for game streaming, 3D application streaming, scientific visualizations/simulations, server-side graphics workloads, rendering, financial modeling, and/or engineering design tasks.

To serve clients with such applications, in various embodiments the VGCS may make remote virtualized graphics devices (such as virtual graphics processing units) available for network access from application compute instances. In such embodiments, after network connectivity has been enabled between an application compute instance and a remote virtualized graphics device instantiated on a hardware platform that comprises processors optimized for graphics processing (such as various types of physical graphical processing units or GPUs), at least some portions of the graphics-related processing of some client applications may be performed using the virtualized graphics devices and the optimized processors. In one embodiment, for example, a client may choose a virtualized graphics device type from several supported classes of virtualized graphics devices, and submit a request to "attach" an instance of the selected virtualized graphics device type to a particular application compute instance, or to instantiate a new application compute instance which has a selected type of virtualized graphics device. In response to such a request, the control plane of the VGCS may enable network access between the application compute instance and the virtualized graphics device in various embodiments. In at least one embodiment, a network configuration manager of the VGCS control plane may implement an algorithm to ensure that network packets associated with graphics-related processing are transmitted between a given application compute instance and a given remote virtualized graphics device in a consistent manner, even in the event of at least some types of networking errors or failures. Such an algorithm may attempt to ensure, for example, that application state information (which may be stored at least in part at the remote virtualized graphics device) is not lost even if the connection between the application compute instance and the remote virtualized graphics device happens to be dropped or terminated prior to the completion of the graphics portion of the application.

In some embodiments, respective isolated virtual networks (IVNs) may be established on behalf of various clients at the VGCS. An isolated virtual network may comprise a collection of networked resources (including, for example, application compute instances) allocated to a given client, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for application compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. Isolated virtual networks may be used by the control plane or administrative components of the VGCS itself for various purposes in some embodiments—e.g., in one embodiment, a set of virtualized graphics devices may be configured within an IVN.

According to one embodiment, a control plane component of the VGCS such as a network configuration manager may determine that a remote virtualized graphics device is to be made accessible from an application compute instance allocated within an IVN established on behalf of a client. The operation of configuring a remote virtualized graphics device for network access from an application compute instance may be referred to as "attaching" the remote virtualized graphics device to the application compute instance in some embodiments. One or more network addresses (e.g., IP version 4 or IP version 6 addresses) within the client's IVN may be identified as source addresses for graphics virtualization-related traffic originating at the application compute instance in some embodiments. In such embodiments, the graphics virtualization-related traffic may comprise, for example, requests for execution of graphics operations (which may be transmitted at any of several layers of a software stack from the application compute instance to the remote virtualized graphics device) and responses to such requests. For example, in one embodiment, a virtual network interface with an IP address IPAddr1 may be configured within the IVN for graphics-related traffic associated with one or more application compute instances. In such an embodiment, network packets comprising graphics processing requests may be transmitted from the application compute instance to a remote virtualized graphics device using IPAddr1 as a source address, and responses from the remote virtualized graphics devices may be directed to IPAddr1. Virtual network interfaces may also be referred to as elastic network interfaces in some embodiments. The terms "graphics-related traffic", "graphics-processing related traffic", and "graphics virtualization-related traffic" may be used interchangeably with respect to at least some embodiments.

In response to determining that the remote virtualized graphics device is to be attached or made accessible from an application compute instance, in one embodiment the control plane component of the VGCS may identify a first source network address of a particular virtual network interface configured for graphics-related traffic of the isolated virtual network of the application compute instance. A particular source port number which is to be associated with the application compute instance may be identified in some embodiments. For example, as discussed below in further detail, in some embodiments a source port number which is currently unused (in the context of the first source network address) may be identified using an atomic update operation on a bit map which represents a range of source port numbers associated with the first source network address. The control plane component may generate routing metadata indicating that a persistent key is to be used to identify a route for a plurality of network packets between the application compute instance and a selected virtualized graphics device in some embodiments. The persistent key may, for example, be based at least in part on the particular source network address and the source port number identified. The routing metadata may be propagated to the appropriate intermediary networking devices, such as various routers of a routing service used at the VGCS in various embodiments. Subsequently, in at least some embodiments the routing metadata may be used at the intermediary networking devices to route packets comprising graphics processing requests originating at the application compute instance, and the packets comprising responses to such requests. In effect, a mapping between a unique (source network address, source port) combination, a particular application compute instance, and a particular remote virtualized graphics device may be generated and made persistent (e.g., by storing the routing metadata in one or more persistent control plane databases) in some embodiments. In at least some embodiments, the persistent mapping may help increase the probability that, if connectivity is temporarily lost between the application compute instance and an attached remote virtualized graphics device, the same remote virtualized graphics device will be used for the application compute instance when the network problem that led to the temporary connectivity interruption is alleviated.

In at least one embodiment, the mappings may be provided not just to the intermediary networking devices which route packets between the application compute instances and the virtualized graphics devices, but also to the application compute instances and/or the virtualized graphics devices themselves. As a result, one or both of the endpoints involved in generating and processing graphics-related traffic may be able to verify or validate that the traffic is being sent to and received from the appropriate peer endpoint in such embodiments. For example, before initiating the graphics processing operations associated with a given request from an application compute instance, a virtualized graphics device may be able to verify that the request originated at the "right" application compute instance (an application compute instance authorized to transmit the request). Similarly, in one embodiment, it may be possible for an application compute instance to verify, using the mapping information provided to it by the VGCS control plane that a response to a submitted graphics request originated at the "right" virtualized graphics device. As a result of such verifications, the security of the applications being run using the combination of the application compute instances and the virtualized graphics device may be further enhanced. In some embodiments, the verifications may be performed on subsets (e.g., randomly-selected subsets) of the messages/packets rather than on all messages/packets in an effort to reduce overhead associated with the verification.

Any of a variety of networking protocols may be used for the graphics related traffic in different embodiments. For example, a Transmission Control Protocol (TCP) connection may be established between the application compute instance and the remote virtualized graphics device in some embodiments. Other protocols may be used in other embodiments. Information about the mappings between the application compute instance, the source IP address and source port associated with the application compute instance, and the remote virtualized graphics device may be transmitted from the VGCS control plane to both endpoints (as well the networking intermediaries) involved in at least some embodiments—e.g., to the application compute instance, and to the remote virtualized graphics device.

Example System Environment

FIG. 1 illustrates an example system environment for virtualizing graphics processing in a provider network, according to one embodiment. As shown, system 100 comprises a provider network 101 in which a virtualized graphics and computing service (VGCS) 102 is implemented. The VGCS 102 may include, among other resources, a control plane fleet 150, one or more isolated virtual networks (IVNs) such as IVN 130 established on behalf of respective clients or customers of the VGCS, one or more graphics resource pools 140, and a routing service 160 in the depicted embodiment. The VGCS may implement a number of programmatic interfaces in the depicted embodiment, including control plane programmatic interfaces 170 and data plane programmatic interfaces 180. The control plane programmatic interfaces 170 may be used, for example, to transmit administrative requests from client devices 120 to the VGCS as indicated by arrow 171, such as requests to instantiate or launch application compute instances 133 with or without attached remote virtualized graphics devices 143, to pause or terminate the application compute instances, to attach or detach remote virtualized graphics devices from application compute instances, and so on. The data plane programmatic interfaces 180 may be used from client devices to access allocated application compute instances 133 as indicated by arrow 175, e.g., to initiate/terminate various applications, inspect the state of applications and so on. Any of a variety of interfaces may be used for the control plane and/or data plane interactions between the clients and the VGCS in different embodiments, such as web-based consoles, application programming interfaces (APIs), command line tools, graphical user interfaces and the like. A client device 120 may, for example, comprise any computing device (such as a laptop or desktop computer, a tablet computer, a smart phone or the like) from which such interfaces may be utilized or invoked in various embodiments.

In the depicted embodiment, IVN 130 has been established for a particular customer C1, and comprises at least four application compute instances 133A, 133B, 133K and 133D. Each of the application compute instances may comprises a respective guest virtual machine running on a virtualization host 132. For example, virtualization host 132A comprises application compute instances 133A and 133B, while virtualization host 132B comprises application compute instances 133K and 133L. At the client's request, one or more remote virtualized graphics devices 143 (e.g., virtual GPUs) may be attached to a given application compute instance 133. For example, as indicated by arrow 191, remote virtualized graphics device 143A may be attached to application compute instance 133K, while as indicated by arrow 192, remote virtualized graphics device 143B may be attached to application compute instance 133A. In some cases, a client may submit a control plane request via an interface 170 indicating that an application compute instance 133 of a particular class or type, with an attached remote virtualized graphics device of a particular class or type, is to be instantiated in the depicted embodiment. In such a scenario, the VGCS control plane may enable the network connectivity between the application compute instance and a selected remote virtualized graphics device as part of the response to the instantiation request— that is, the application compute instance may be provided to the client with a remote virtualized graphics device already attached. In other cases, a client may first obtain an application compute instance 133 which does not have a remote virtualized graphics device configured for it, and later request than a remote virtualized graphics device 143 be attached to the application compute instance. Clients may also request detachment of remote virtualized graphics devices as and when desired, using programmatic interfaces 170.

In response to determining that a remote virtualized graphics device is to be attached to an application compute instance, in one embodiment a provisioning and capacity manager 153 of the VGCS control plane may first determine whether sufficient unused resources are available in the graphics resource pool(s) 140 for the request to be fulfilled. If sufficient resources are found, a particular virtualized graphics device 143 (e.g., 143A or 143B), may be reserved and/or instantiated at a particular graphics host 142 (e.g., 142A) for the application compute instance. A network configuration manager 154 of the VGCS control plane may then identify the network address and source port to be used for the application compute instance's graphics-related traffic in one embodiment. As mentioned earlier, in at least some embodiments, one or more network addresses (e.g., associated with one or more virtual network interfaces) may have been designated for graphics virtualization-related traffic of the IVN 130. In one embodiment, a technique involving an atomic update to a data structure such as a bit map which represents source port numbers may be used to identify a source port to be used for a given application compute instance's graphics-related traffic. Once the combination of source network address and source port (where the term "source" is applicable from the perspective of traffic originating at the application compute instance) has been identified, a routing metadata entry indicating that the source network address and the source port are to be used for graphics-related traffic between the application compute instance and the remote virtualized graphics device may be transmitted from the VGCS control plane fleet 150 to the routing service 160 in the depicted embodiment, as indicated by arrow 173. A copy of the routing metadata entry may be stored in repository 163 and/or in other persistent repositories (e.g., in the VGCS control plane fleet) in various embodiments, and may be propagated to various routing intermediary devices 164 (such as routers, gateways, switches and the like) that are used to transfer packets on paths between the application compute instance and the remote virtualized graphics device. After the routing metadata or mapping has been transmitted or stored at the appropriate set of components of the routing service 160, network packets between the application compute instance and the attached remote virtualized graphics device may be routed in either direction using the metadata/mapping in the depicted embodiment.

In at least one embodiment, the mappings between the source network address, the source port, the application compute instance, and the remote virtualized graphics device may also be sent to the isolated virtual network (as indicated by arrow 172) and to the graphics resource pool 140 (as indicated by arrow 174). In one embodiment, the mapping may be provided to one or both of the endpoint entities involved in the graphics traffic—the application compute instance 133 and the remote virtualized graphics device 143. Using the mapping, one or both of the entities may be able to verify that graphics-related network packets or messages that they have received are from the appropriate authorized endpoints in various embodiments, thereby enhancing application security. In one embodiment, for example, prior to performing graphics processing operations indicated in a received request, a remote virtualized graphics device 143 may use the mapping to validate that the request originated at an acceptable or expected application compute instance. In another embodiment, before accepting results of graphics processing included in a received message, an application compute instance 133 may use the mapping to validate that the message originated at the virtualized graphics device to which the corresponding request was directed.

In one embodiment, the VGCS 102 may offer application compute instances 133 with varying computational and/or memory resources. In one embodiment, each of the application compute instances 133 may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality of the VGCS 102, an instance type may be selected for a client, e.g., based (at least in part) on input from the client. For example, a client may choose an instance type from a predefined set of instance types. As another example, a client may specify the desired resources of an instance type, and the VGCS control plane may select an instance type based on such a specification.

In one embodiment, the VGCS 102 may offer virtualized graphics devices 143 with varying graphics processing capabilities. In one embodiment, each of the virtualized graphics devices 143 may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using instance type selection functionality of the VGCS, a virtual GPU class may be selected for a client, e.g., based (at least in part) on input from the client. For example, a client may choose a virtual GPU class from a predefined set of virtual GPU classes. As another example, a client may specify the desired resources of a virtual GPU class, and the instance type selection functionality may select a virtual GPU class based on such a specification.

In at least one embodiment, the resources of a given virtualization host and/or a given graphics host may be used in a multi-tenant fashion—e.g., application compute instances of more than one client may be established at a given virtualization host, or virtualized graphics devices for more than one client may be established at a given graphics host. In other embodiments, a single-tenant approach may be used with respect to at least some virtualization hosts and/or at least some graphics hosts—e.g., application compute instances of no more than one client may be instantiated on a given virtualization host, and virtualized graphics devices of no more than one client may be instantiated on a given graphics host.

Figure 2:
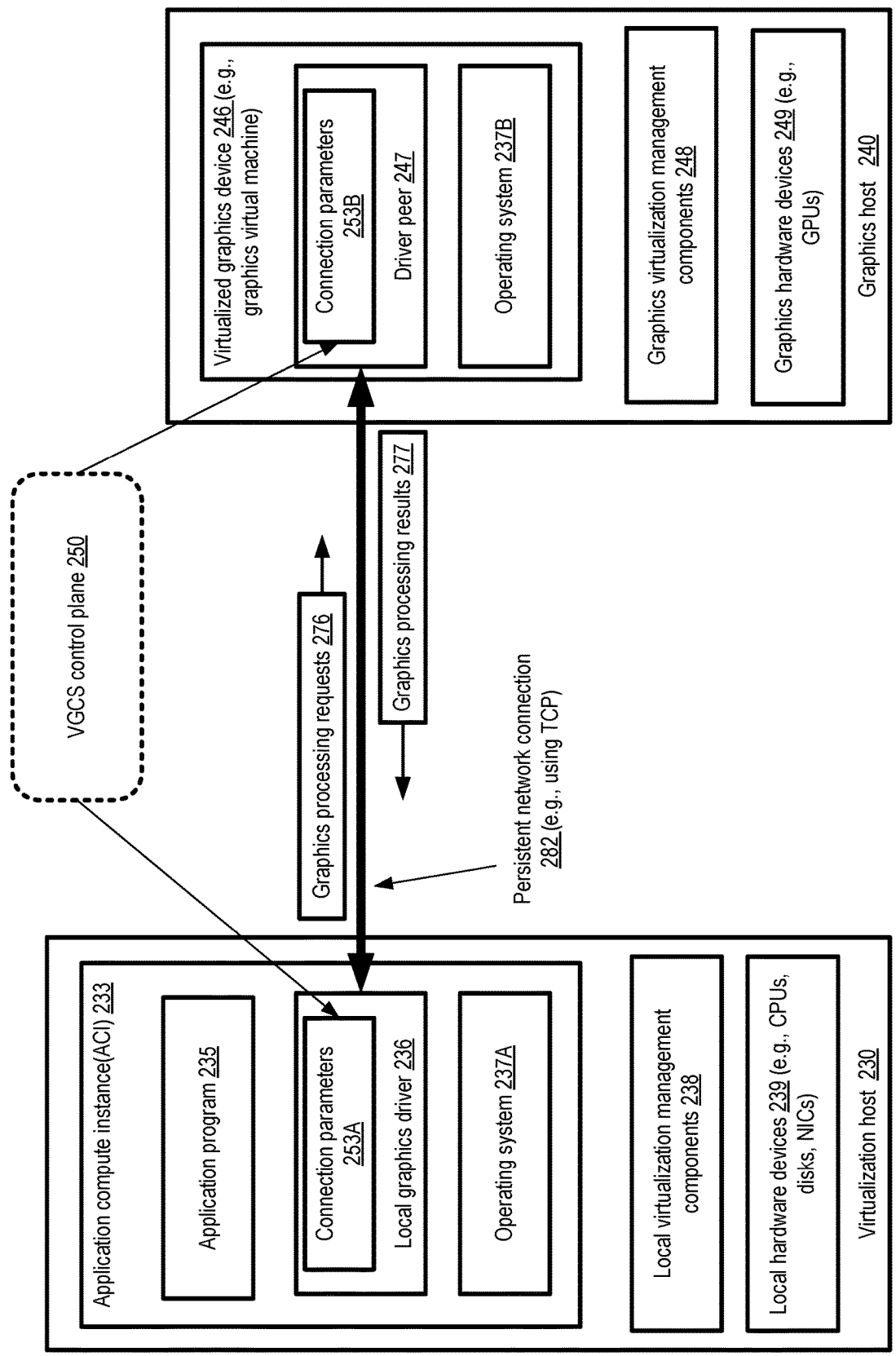
FIG. 2 illustrates example components of virtualization hosts and graphics hosts which may be used for virtualizing graphics processing, according to at least some embodiments.

FIG. 2 illustrates example components of virtualization hosts and graphics hosts which may be used for virtualizing graphics processing, according to at least some embodiments. As shown, a virtualization host 230 may comprise a set of local hardware devices 239, local virtualization management components 238, and one or more application compute instances 233 in the depicted embodiment. A graphics host 240 may comprise one or more graphic hardware devices 249 (e.g., including graphics processing units or GPUs), graphics virtualization management components 248, and one or more virtualized graphics devices 246 in the depicted embodiment. The respective virtualization management devices at the virtualization host and the graphics host may be responsible for handling interactions between the hardware devices and the virtual devices implemented at the respective hosts—e.g., the application compute instance(s) and the virtualized graphics device(s). At the virtualization host, for example, the virtualization management components may include a hypervisor, a privileged instance of an operating system, and/or one or more peripheral devices which may be used for handling networking-related virtualization tasks (such as translations between network addresses assigned to a physical Network Interface Card and network addresses of virtual network interfaces) in some embodiments. Analogous virtualization management components may be instantiated at the graphics host 240 in at least some embodiments.

In the depicted embodiment, an application compute instance 233 (e.g., a guest virtual machine instantiated at virtualization host 230) may comprise, among other constituent elements, an application program 235, an operating system 237A and a local graphics driver 236. A virtualized graphics device 246, which may also be referred to as a graphics virtual machine, may comprise an operating system 237B and a driver peer 247 which communicates with the local graphics driver 236 of the application compute instance 233. A persistent network connection 282 may be established (e.g., as part of a procedure to attach the virtualized graphics device 246 to the application compute instance 233) between the local graphics driver 236 and the driver peer 247 in the depicted embodiment. In some embodiments, for example, TCP may be used for the connection. Connection parameters 253A and 253B, such as the network addresses and ports (including a unique source port associated with the application compute instance) to be used for the connection at either endpoint, may be determined at the VGCS control plane 250 and transmitted to the virtualization host and the graphics host in some embodiments. Graphics processing requests 276 may be transmitted over the connection 282 from the local graphics driver 236 to driver peer 247 in the depicted embodiment. From the driver peer 247, corresponding local versions of the graphic processing requests may be transmitted to the graphics hardware devices 249, and the results 277 obtained from the graphics hardware devices 249 may be transmitted back to the virtualization host via connection 182. The local graphics driver 236 may interact with the virtualized graphics device 246 to provide various types of graphics processing operations for application program 235 in the depicted embodiment, including accelerated two-dimensional graphics processing and/or accelerated three-dimensional graphics processing. In one embodiment, the local graphics driver 236 may implement a graphics application programming interface (API) such as Direct3D or OpenGL. In the depicted embodiment, the local graphics driver 236 may comprise components running in user mode and/or kernel mode. Additional components (not shown), such as a graphics runtime, may also be used to provide accelerated graphics processing on the application compute instance 233 in some embodiments.

The layers of the software/hardware stack at which a network connection is established and maintained between the virtualization host and the graphics host may differ in different embodiments. For example, in one embodiment, a process or thread in the operating system layer 237A of the application compute instance may establish a persistent network connection with a peer process or thread in the operating system layer 237B of the virtualized graphics device 246. In another embodiment, a respective persistent network connection may be established between the virtualization management components of the virtualization host and the graphics host for individual application compute instances. In some embodiments, persistent connectivity for graphics-related traffic may be established at a layer that lies below the virtualization management components at each host, and above the respective hardware devices at each host.

Mappings Between Application Compute Instances and Source Ports

Figure 3:
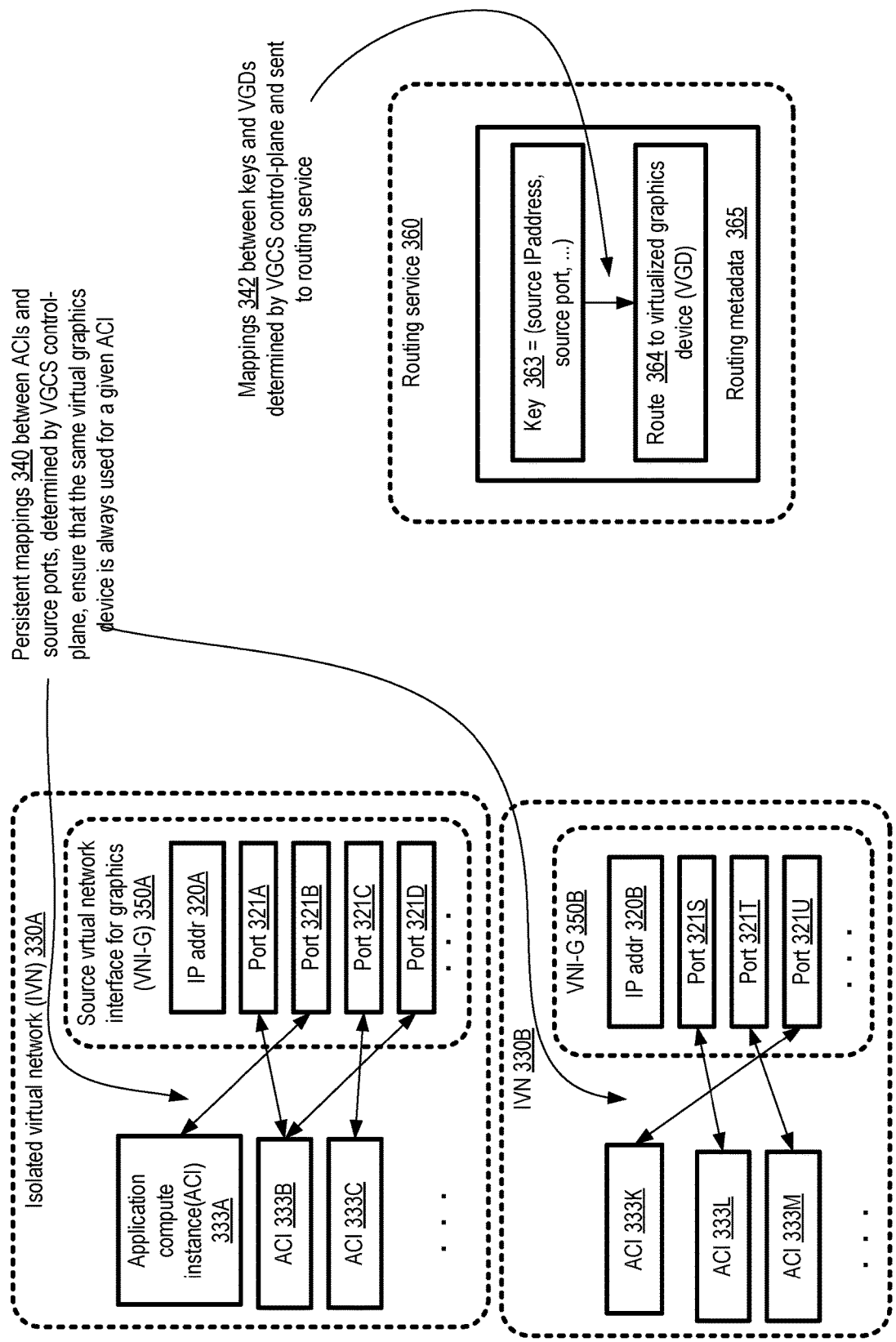
FIG. 3 illustrates examples persistent mappings between application compute instances and ports, which may be used for routing traffic associated with graphics virtualization, according to at least some embodiments.

FIG. 3 illustrates examples persistent mappings between application compute instances and ports, which may be used for routing traffic associated with graphics virtualization, according to at least some embodiments. In the depicted embodiment, isolated virtual network (IVN) 330A comprises at least three application compute instances 333A-333C, while IVN 330B comprises application compute instances 333K, 333L and 333M. For each of the two IVNs, a respective source virtual network interface for graphics (VNI-G) 350 has been established, and the TCP/IP suite of protocols is assumed to be used for network communications. (Other networking protocols may be used in other embodiments). A given VNI-G may represent a set of networking properties (e.g., one or more IP addresses, a range of ports, security settings, etc.) which can be logically associated or disassociated with entities such as application compute instances in various embodiments, e.g., without requiring re-configuration of the underlying physical networking devices such as network interface cards. In the depicted embodiment, VNI-G 350A has been established for graphics virtualization-related traffic associated with IVN 330A, while VNI-G 350B has been established for graphics virtualization-related traffic associated with IVN 330B. In other embodiments, more than one VNI-G may be established for graphics virtualization-related traffic of a given IVN 330—e.g., depending on the number of different application compute instances in an IVN to which virtualized graphics devices are to be attached, the number of VNI-Gs established may be increased or decreased.

In the depicted embodiment, each VNI-G has an associated IP address 320 for use for graphics virtualization-related traffic. For example, VNI-G 350A has IP address 320A, while VNI-G has IP address 320B. For a given IP address, a range of ports may be used for TCP connections in various embodiments. For example, integers within the range 1024-65536 (or some other selected range or combination of ranges) may be available as port numbers in some embodiments in which IP version 4 is used. From within that range of port numbers, one or more may be assigned for use by a given application compute instance (ACI) for graphics virtualization-related traffic in the depicted embodiment. For example, in IVN 330A, ACI 333A has port 321B designated for its use, ACI 333B has ports 321A and 321D designated for its use, ACI 333C has port 321C. In IVN 330B, ACI 333K has port 321U designated for its use, ACI 333L has port 321S designated for its use, and ACI 333M has port 321T designated for its use. In at least one embodiment, graphics processing operations may be performed at more than one remote virtualized graphics device on behalf of a given application compute instance, and a respective port may be used for traffic between the ACI and individual ones of the remote virtualized graphics devices. Thus, for example, the designation of ports 321A and 321D for use by ACI 333B may indicate that two remote virtualized graphics devices are being used to process graphics operations requested from ACI 333B in the depicted embodiment. It is noted that in some embodiments a given VNI-G may have several different IP addresses 350 associated with it, in which case a larger total number of ports may be available for graphics virtualization-related traffic than if only a single IP address were used for a given VNI-G 350.

In the depicted embodiment, persistent mappings 340 between the ACIs and (source IP address, source port) combinations may be determined by the VGCS control plane. These mappings may be used, for example, to ensure that the same set of one or more virtualized graphics devices is used for a given ACI, regardless of temporary network outages or dropped connections. Routing metadata entries 365 stored at a routing service 360 may use keys 363 which are based at least in part on the combination of (source IP address, source port) to look up routes 364 to the correct virtualized graphics devices. The mappings 342 between the keys 363 and the routes 364 may be generated by the VGCS and sent to the routing service 360 for directing network packets associated with virtualized graphics processing.

In FIG. 3, an example of the use of multiple virtualized graphics devices (for each of which a distinct source port is selected) by a given application compute instance (ACI 333B) is shown. Thus, in the depicted embodiment, a 1:N relationship between application compute instances and virtualized graphics devices may be supported. In at least one embodiment, a given virtualized graphics device may be configured for access from multiple application compute instances: that is, an N:1 relationship between compute instances and remote virtualized graphics devices may be supported. More generally, in some embodiments, an M:N relationship between application compute instances and virtualized graphics devices may be supported, in which a given application compute instance may potentially have graphics processing performed on its behalf at multiple virtualized graphics devices, and a given virtualized graphics device may potentially perform graphics processing on behalf of multiple application compute instances. In some such embodiments, a given source port may be used for several (or all) compute instances which communicate with a given virtualized graphics device. In other embodiments, a distinct source port may be used for each unique (application compute instance, virtualized graphics device) combination. The appropriate routing metadata/mappings between the application compute instances, source ports, and/or the virtualized graphics devices may be generated at the control plane in various embodiments, regardless of whether 1:N, N:1 or M:N relationships are supported between application compute instances and virtualized graphics devices, and regardless of whether a single source port or multiple source ports are to be used for traffic directed to a given virtualized graphics device. The generated metadata may be transmitted to the routing service 360 and/or the endpoints involved in the graphics-related traffic in such embodiments.

Method for Managing Traffic Management for Graphics Virtualization

Figure 4:
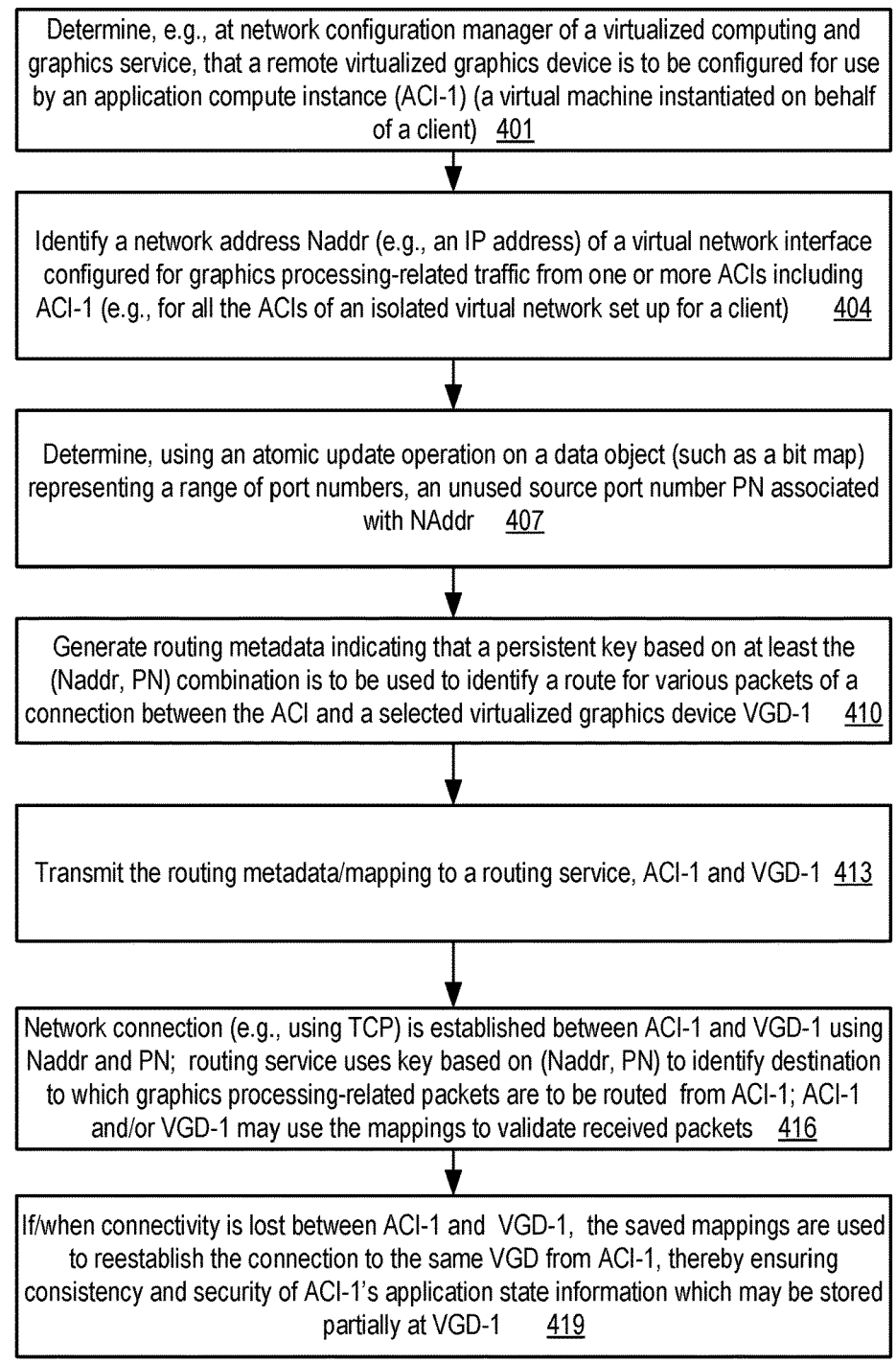
FIG. 4 is a flow diagram illustrating aspects of operations that may be performed to enable routing of network traffic associated with graphics virtualization, according to at least some embodiments.

FIG. 4 is a flow diagram illustrating aspects of operations that may be performed to enable routing of network traffic associated with graphics virtualization, according to at least some embodiments. As shown in element 401, a determination may be made that a remote virtualized graphics device is to be configured for network access from an application compute instance (ACI-1) on behalf of a client. The determination may be made, for example, at a control plane component of a virtualized graphics and computing service such as a network configuration manager in response to a request submitted via a programmatic interface such as a web-based console, an API, a command line tool or a graphical user interface. It is noted that at the time that the determination is made, ACI-1 may not necessarily have been instantiated in at least some embodiments—e.g., the determination may be made in response to a request to launch an ACI with an attached remote virtualized graphics device. In other embodiments, the determination may be made after ACI-1 has been instantiated, e.g., in response to a command to attach a remote virtualized graphics device to ACI-1.

A network address NAddr (e.g., an IP version 4 address) to be used for graphics virtualization-related traffic on behalf of one or more application compute instances including ACI-1 may be identified (element 404) in the depicted embodiment. In one embodiment, a single network address, e.g., associated with a virtual networking interface set up specifically for graphics virtualization-related traffic in an isolated virtual network may be used for several different ACIs including ACI-1. In other embodiments, multiple network addresses may be used for graphics virtualization-related traffic of the isolated virtual network.

In some embodiments, an atomic update operation on a data structure such as a bit map representing a range of source ports may be used to identify an unused source port BN of NAddr to be used for ACI-1's graphics traffic (element 407). In some embodiments, a conditional write primitive supported by a database service (e.g., a non-relational database service, a relational database service, or an object database service) may be used for the atomic update. In other embodiments, an atomic update may not be used.

A routing metadata entry or mapping may be generated, e.g., at the VGCS control plane, indicating that a persistent key based at least in part on (NAddr, PN) is to be used to look up a route for various network packets to be transmitted between API-1 and a selected virtualized graphics device VGD-1 (element 410). The routing metadata/mapping may be transmitted to a routing service (element 413), to ACI-1, and to VGD-1 in the depicted embodiment. In at least one embodiment, the mapping may be stored in persistent storage at one or more locations—e.g., in the control plane, in a metadata repository at the routing service, at ACI-1 and/or at VGD-1.

A network connection (e.g., a TCP connection, or a connection using any other appropriate networking protocol) may be established between ACI-1 and VGD-1 using the (NAddr, PN) as ACI-1's source-side address and port in the depicted embodiment (element 416). The routing service may begin using the key based at least in part on the (NAddr, PN) combination to determine the destination and/or route elements to be used for virtualized graphics-related network packets originating at ACI-1. As discussed earlier, in at least one embodiment the metadata or mappings may be used at ACI-1 and/or at VGD-1 to verify/validate the sources of received packets, and thereby enhance the security of the application being executed using VGD-1. If/when connectivity is lost between ACI-1 and VGD-1, the persistent mapping or routing metadata may be used to re-establish the connectivity between ACI-1 and VGD-1 after connectivity again becomes possible (e.g., after the problem that led to lost connectivity has been addressed or is no longer affecting traffic) (element 419). As such, the security and consistency of ACI-1's application state information (some or all of which may have been stored at VGD-1) may be maintained in the depicted embodiment. In some embodiments, existing mechanisms of the underlying networking protocol (e.g., TCP) for connection establishment may be used—e.g., if a connection is identified as being closed, a new three-way handshake to establish the connection may be attempted with the appropriate address and port information.

Example Port Mapping Object

Figure 5:
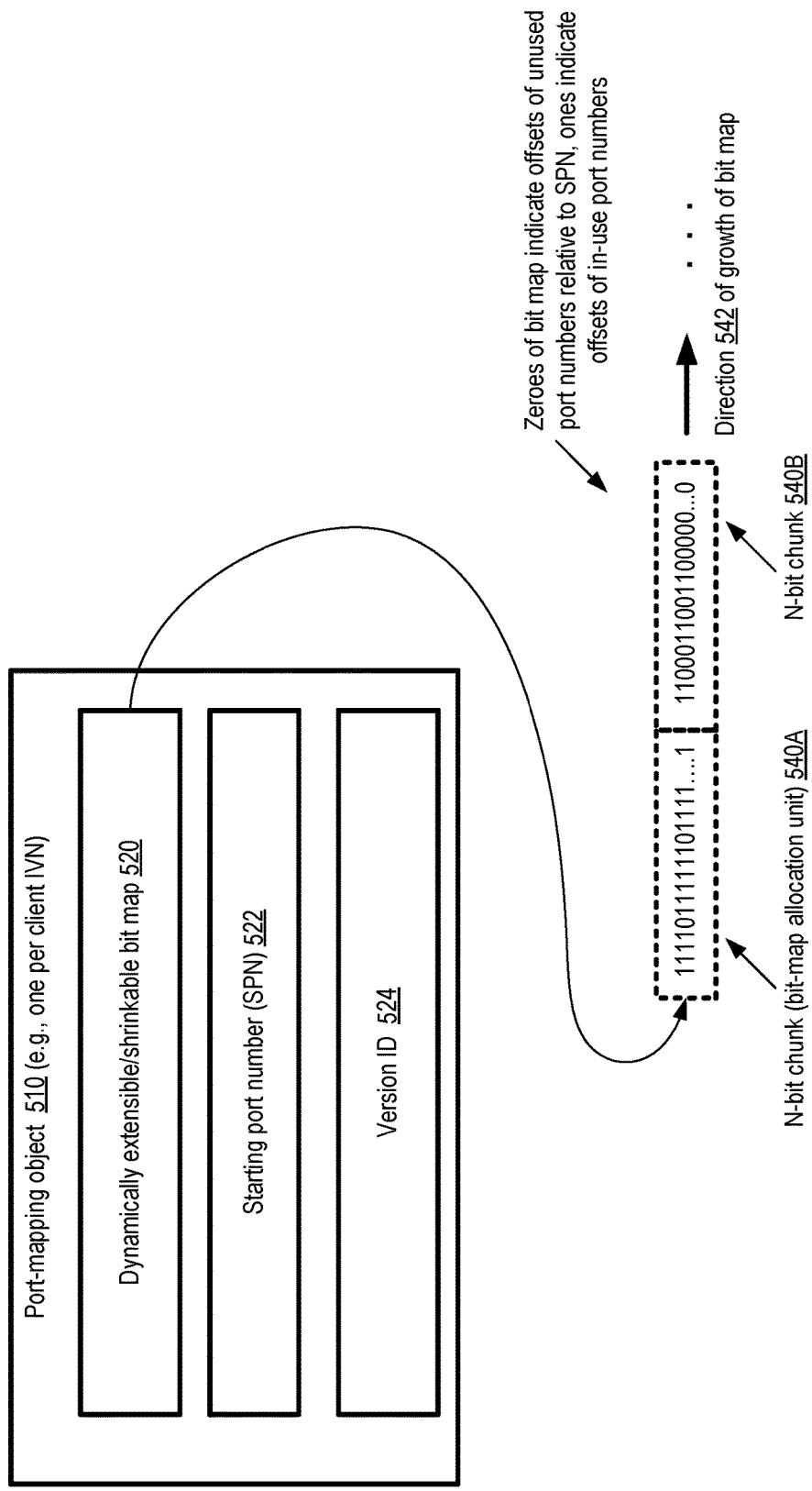
FIG. 5 illustrates an example port mapping object which may be used for identifying port numbers to be used to route network traffic associated with graphics virtualization, according to at least some embodiments.

FIG. 5 illustrates an example port mapping object which may be used for identifying port numbers to be used to route network traffic associated with graphics virtualization, according to at least some embodiments. In the depicted embodiment, a port mapping object 510 may comprise a dynamically extensible/shrinkable bit map 520, a starting port number (SPN) 522 and or a version identifier 524. Port numbers starting at the SPN and lower than a maximum allowed port number (e.g., 65535) may be used for routing network traffic associated with virtualized graphics devices in the depicted embodiment. In some embodiments, an ending port number may also be indicated in the port mapping object, or a set of allowable ranges of ports may be indicated. In one embodiment, one such port mapping object 510 may be created for each IVN which is to comprise application compute instances requiring virtualized graphics processing.

The bit map 520 may be used as follows in the depicted embodiment. Initially, before any connections for virtualized graphics-related traffic are established, the bit map may be empty. When a first request for attaching a remote virtualized graphics device is received at the VGCS control plane, indicating that a new unused source port number is needed, an N-bit allocation unit or chunk 540A may be added to the bit map 520, with all the bits initially set to 0 (indicating all the source ports corresponding to the chunk are unused). (In other embodiments, a bit set to 1 may indicate an unused source port, while a bit set to 0 may indicate an in-use source port.) The first bit of the chunk (at offset 0) may be set to 1, indicating that the source port corresponding to SPN+(offset) is now reserved for use for graphics-processing related traffic from an application compute instance. As more requests for attaching remote virtualized graphics devices are received, more bits of the bit map may be set to 1, each indicating that a source port number equal to SPN added to the offset of the bit has been reserved for use.

When a remote virtualized graphics device is detached from its application compute instance, or the corresponding application compute instance is terminated, the bit representing the corresponding source port may be reset to indicate that the source port is no longer in use. If all the source ports corresponding to the most recently-added N-bit allocation unit such as 540A are in use when a request for a source port is received, another N-bit chunk (such as 540B) may be added, and the bit map may grow in the direction indicated by arrow 542.

In various embodiments, a number of requests for unused source ports may be received concurrently or near-concurrently at the VGCS control plane. As such, a mechanism for ensuring consistency of the bit map 520 in the presence of potentially concurrent update attempts may be implemented in at least some embodiments. In one embodiment, an atomic update operation may be used to identify unused source ports and set the appropriate bit of the bit map 520. In one implementation, a storage service or database that supports conditional write operations may be used to manage accesses to the bit map, e.g., using version ID 524 to express the condition that has to hold for a write to be successful. For example, consider a scenario in which the current version ID is the integer K at the time that a request for a source port is received. The control plane component responsible for determining the source port may read the port mapping object, identify an unused source port by finding a bit set to zero (assuming zeroes represent unused port number offsets relative to SPN), and attempt to perform a conditional write which sets the bit to one and the version ID to (K+1), specifying that this change is to be committed only if the version ID at the database is still K at the time that the conditional write request is processed. If the version ID is still K at the database, the change may be applied atomically to the bit map and the version ID in such an embodiment. If the version number is no longer K, the conditional write may be rejected, and the procedure for identifying a source port may have to be retried by the control plane component. Other approaches towards atomic updates may be used in some embodiments, e.g., a lock may be acquired on the port mapping object 510, or a test-and-set instruction may be used. In some embodiments, data structures other than bit maps, such as database table rows, may be used for representing source ports.

Methods for Source Port Selection and Release

Figure 6:
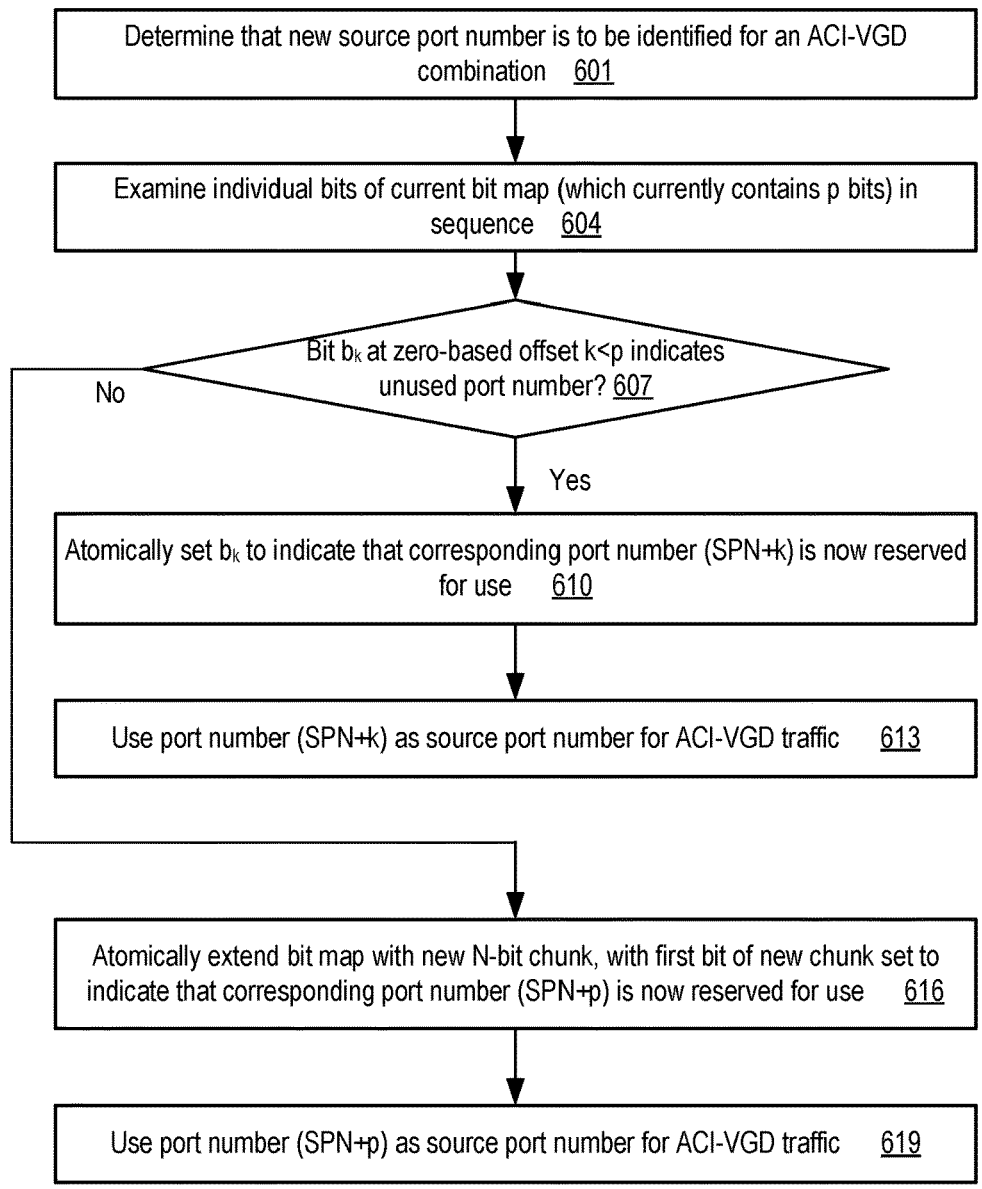
FIG. 6 is a flow diagram illustrating aspects of operations that may be performed to identify a source port for a connection between an application compute instance and a virtualized graphics device, according to at least some embodiments.

FIG. 6 is a flow diagram illustrating aspects of operations that may be performed to identify a source port for a connection between an application compute instance and a virtualized graphics device, according to at least some embodiments. As shown in element 601, a determination may be made that a new (currently unused) source port is to be identified for traffic between a particular application compute instance (ACI) and a virtualized graphics device (VGD). A bit map similar to that illustrated in FIG. 6 is assumed to be used to represent source port usage in the depicted embodiment, the current number of bits in the bit map is assumed to be p, and a starting source port number is set to SNP. A request to obtain a source port number may be transmitted in one embodiment, for example, from one VGCS control plane component responsible for attaching remote virtualized graphics devices to another VGCS control plane component responsible for ensuring the consistency and uniqueness of source port mappings.

The bits of the bit map may be examined in sequence, starting for example from the offset 0 (the first bit of the bit map) which corresponds to the smallest source port number SNP which could be used (element 604). If the setting of a bit bk at an zero-based offset k which is less than p indicates that the corresponding source port (SNP+k) is unused, as determined in element 607, the value of bk may be set, e.g., using an atomic update operation on the bit map, to indicate that port (SNP+k) is now reserved for use (element 610). The port number (SNP+k) may be returned to the requester, and may be used as the source port for graphics virtualization-related traffic originating at the ACI and directed to the VGD (element 613).

If the entire bit map has been examined and no bit indicating an unused port number is found, as may also be detected in operations corresponding to element 607, the bit map may be extended by adding a new N-bit chunk or allocation unit (element 616) in the depicted embodiment. An atomic update operation may be used to add the new chunk to the bit map in at least some embodiments, with the first bit (at offset 0) of the chunk set to indicate that the source port number (SNP+p) is now reserved for use. The port number (SNP+p) may be returned to the requester, and may be used as the source port for graphics virtualization-related traffic originating at the ACI and directed to the VGD (element 619).

Figure 7:
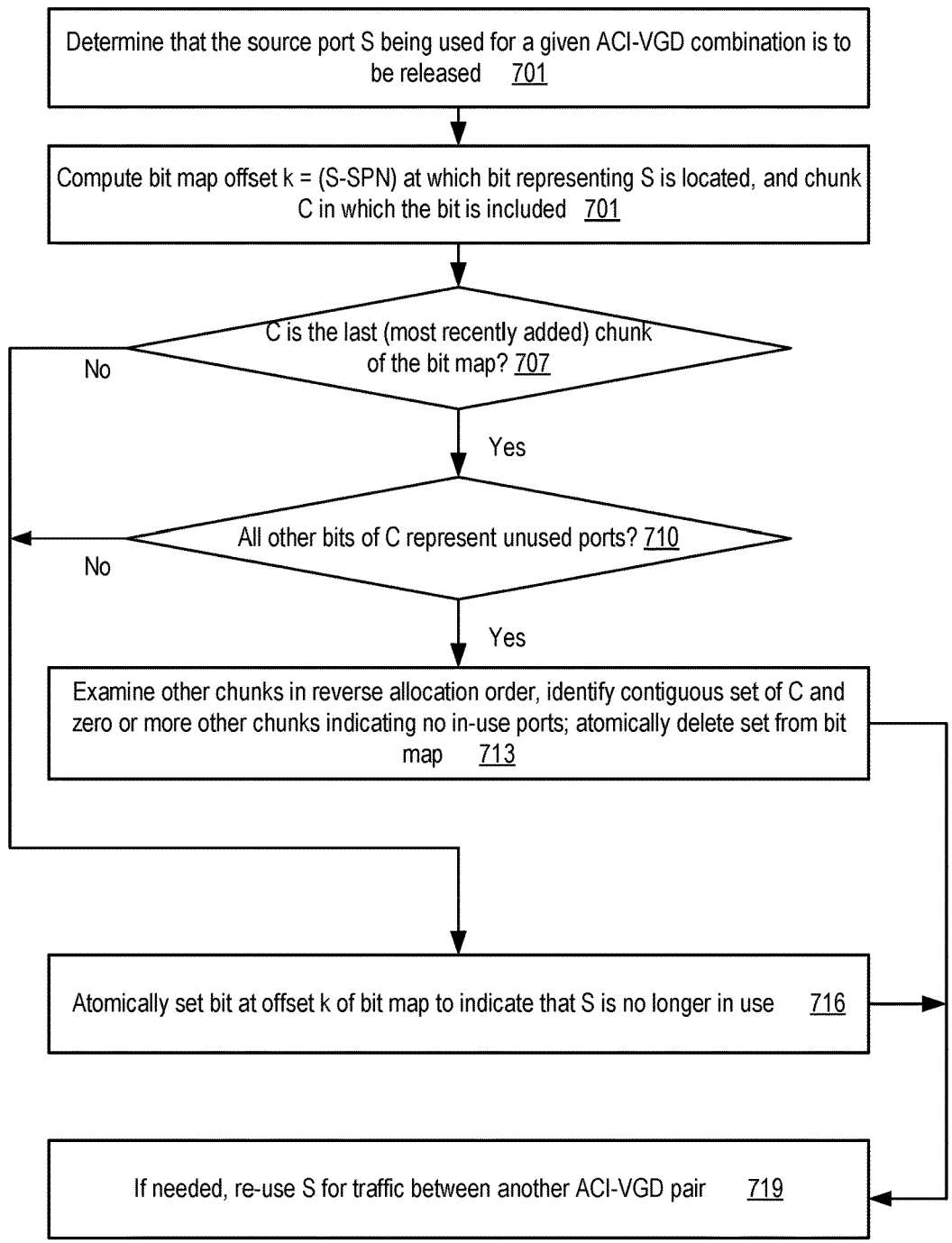
FIG. 7 is a flow diagram illustrating aspects of operations that may be performed to release a source port which was being used for a connection between an application compute instance and a virtualized graphics device, according to at least some embodiments.

FIG. 7 is a flow diagram illustrating aspects of operations that may be performed to release a source port which was being used for a connection between an application compute instance and a virtualized graphics device, according to at least some embodiments. As in the embodiment corresponding to FIG. 6, a bit map is assumed to be used as the data structure representing source ports, with SPN being the starting port number, and the bit map being extended in N-bit chunks. As shown in element 701, a determination may be made that a source port S being used for a given application compute instance and virtualized graphics device combination is to be released. Such a determination may be made, for example, in response to receiving a request to terminate the application compute instance, to detach the virtualized graphics device, or to discontinue communication between the application compute instance and the virtualized graphics device for some other reason. The offset of the bit within the bit map (e.g., S-SPN) which corresponds to port S may be identified, and the chunk C within which the bit lies may be identified (element 704).

If C is not the most recently-added chunk (e.g., the chunk corresponding to the highest allocated source port numbers), as determined in element 707, or if at least one other bit of C indicates an in-use port number, as determined in element 710, an atomic update operation may be used to set the bit representing port S to indicate that S is no longer reserved for use (element 716). Otherwise, in the depicted embodiment, C may have no other bits indicating in-use ports and C may be the most-recently added chunk. In this scenario, the chunks of the bit map other than C (if any) may be examined in reverse allocation order, to identify the set of contiguous chunks including C which have no bits indicating in-use ports. That set of chunks (C and zero or more other contiguous chunks) may then be atomically deleted from the bit map, thereby reducing the size of the map (element 713) in the depicted embodiment. After the source port number S has been released, at some later point in time the same number may be re-used, e.g., to configure a route between some other application compute instance and virtualized graphics device (element 719). It is noted that at least in one embodiment, the bit map may not necessarily be shrunk by removing chunks as indicated in element 713; instead, the bit map may continue to retain any chunks that have been added, regardless of whether the chunks indicate any in-use ports or not. As mentioned earlier, in at least some embodiments, data structures or objects other than bit maps may be used to represent port numbers.

It is noted that in various embodiments, some of the operations shown in FIG. 4, FIG. 6 or FIG. 7 may be implemented in a different order than that shown in the figure, or may be performed in parallel rather than sequentially. Additionally, some of the operations shown in FIG. 4, FIG. 6 or FIG. 7 not be required in one or more implementations.

Availability Containers and Graphics Traffic Management

Figure 8:
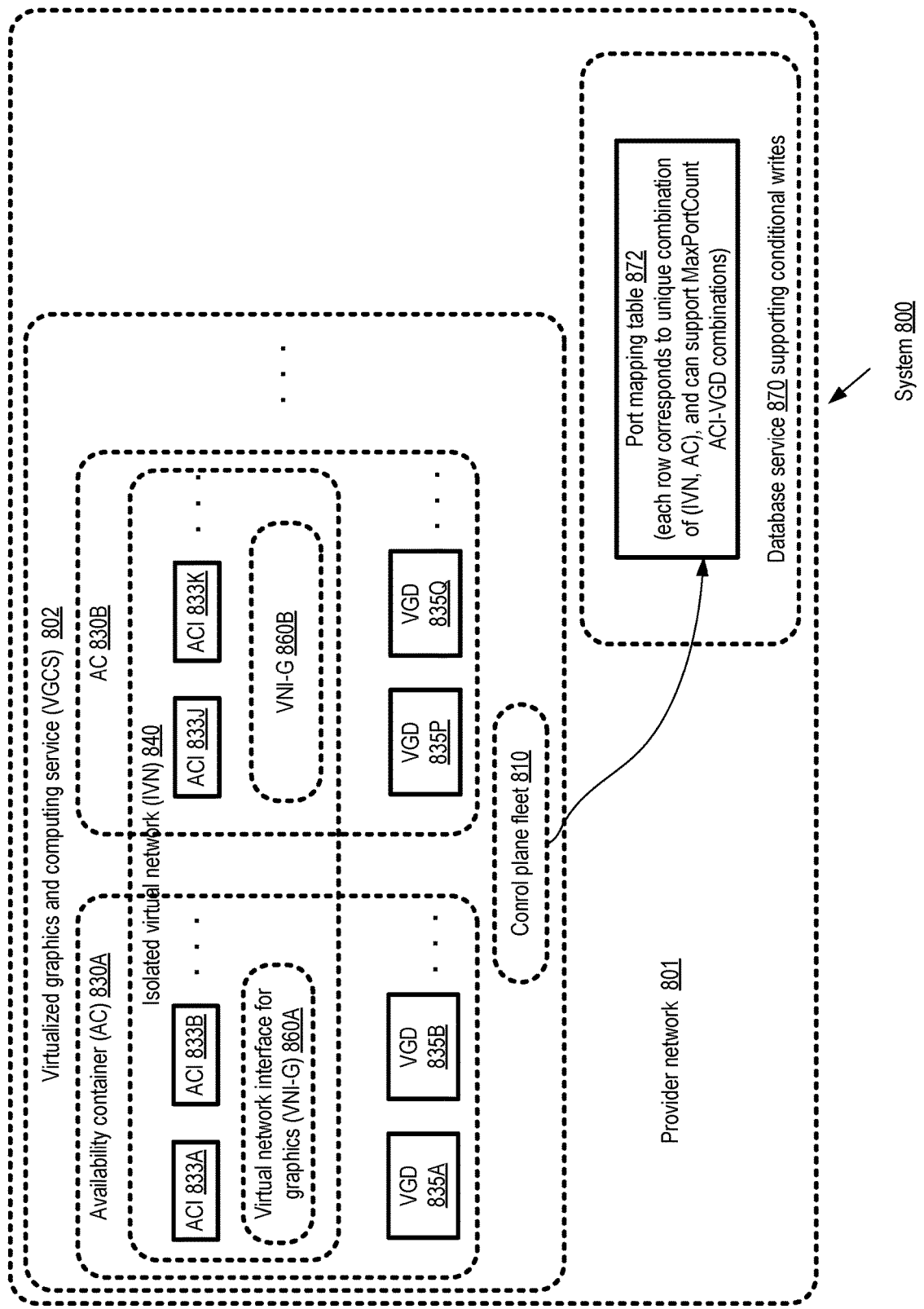
FIG. 8 illustrates an example system environment in which resources of a virtualized graphics and computing service may be distributed across availability containers, according to at least some embodiments.

FIG. 8 illustrates an example system environment in which resources of a virtualized graphics and computing service may be distributed across availability containers, according to at least some embodiments. In one embodiment, a provider network at which a virtualized graphics and computing service is implemented may be organized into a plurality of geographical regions, and each region may include one or more availability containers, which may also be termed "availability zones". An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. Various types of services and/or applications may therefore be protected from failures at a single location by launching multiple application instances in respective availability containers, or distributing the nodes of a given application across multiple availability containers.

In the embodiment depicted in FIG. 8, provider network 801 of system 800 comprises a virtualized graphics and computing service (VGCS) 802 and a database service 870. The VGCS 802 may comprise a plurality of availability containers (ACs), including availability containers 830A and 830B. An isolated virtual network (IVN) 840 set up for a client may comprise application compute instances (ACIs) spread across the two availability containers. For example, application compute instances 833A and 833B may be set up in availability container 830A, while application compute instances 833J and 833K may be established in availability container 830B. A respective virtual network interface (VNI-G) may be configured in each availability container for graphics virtualization-related traffic in the depicted embodiment. For example, VNI-G 860A may set up in availability container 830A, while VNI-G 860B may be set up in availability container 830B. One or more of the application compute instances 833 may offload graphics processing workloads to respective virtualized graphics devices (VGDs) 835 in the depicted embodiment. In at least one embodiment, ACIs within a given availability container 830 may be attached to VGDs within the same availability container. For example, ACIs 833A and 833B may utilize VGDs 835A or 835B, while ACIs 833J and 833K may utilize VGDs 835P or 835Q. A network address associated with the VNI-G within the availability container, and a source port associated with the VNI-G, may be used to uniquely map each (ACI, VGD) combination in the depicted embodiment.

Database service 870 may be used to store the port mappings used for routing graphics virtualization-related traffic in the depicted embodiment between ACIs and VGDS. For example, a port mapping table 872, each of whose rows comprises a port mapping object similar to that discussed in the context of FIG. 5 for a different (IVN, AC) combination, may be used in the depicted embodiment. If MaxPortCount is the maximum number of distinct source ports which can be used for routing graphics virtualization-related traffic for a given IP address, each row of table 872 may be able to support MaxPortCount distinct (ACI-VGD) combinations. In at least one embodiment, VGDs in one availability container may be attached to ACIs in another availability container.

Use Cases

The techniques described above, of generating and storing persistent mappings between application compute instances and attached remote virtualized graphics devices using unique source port number may be useful in a variety of scenarios. A wide variety of applications may be able to benefit from advanced graphics processing capabilities, such as applications in the domains of game streaming, rendering, financial modeling, engineering design, scientific visualization/simulation, and the like. Executing such applications on conventional CPUs may not be efficient, especially for large data sets. Using remote-attached virtualized graphics devices may be a more suitable approach for at least some such applications. However, for some such applications, at least a portion of application state information may be stored at the virtualized graphics devices during part of the execution, and losing the application state information (e.g., due to temporary network problems) may be problematic. The approach of using persistent mappings with unique source ports per combination of application compute instance and virtualized graphics device may help avoid the loss of application state information.

Illustrative Computer System

Figure 9:
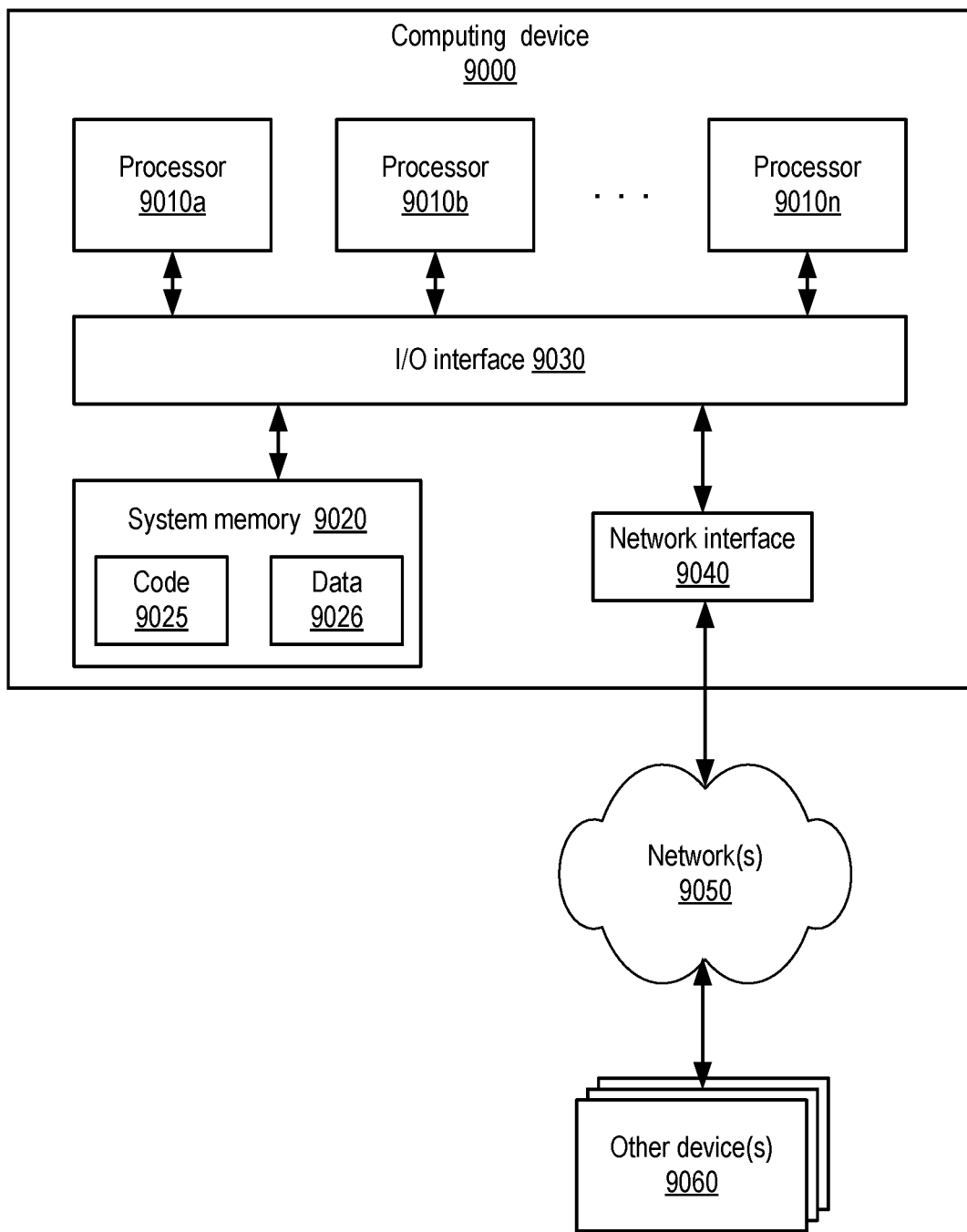
FIG. 9 is a block diagram illustrating an example computing device that may be used in at least some embodiments.

In at least some embodiments, a server that implements one or more of the techniques described above for managing traffic associated with virtualized graphics processing, including a network configuration manager, routers, and various other control plane and data plane entities of a virtualized graphics and computing service or a routing service, may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
   a network configuration manager executing on one or more computing devices of a provider network,
   wherein the network configuration manager includes instructions that upon execution on a processor cause the one or more computing devices to:

re-establish accessibility, responsive to an interruption of a network connection, from an application compute instance to a virtualized graphics device via a virtual network interface of a routing device based at least in part on routing metadata,
wherein:
the network connection comprises a first network connection between the application compute instance and the virtual network interface of the routing device and a second network connection between the virtual network interface of the routing device and the virtualized graphics device;
the routing metadata indicates that the virtual network interface is to be used to identify a route from the application compute instance to the virtualized graphics device; the interruption of the network connection comprises an interruption of either the first network connection or the second network connection; and
to re-establish accessibility, the one or more computing devices are configured to:
restore the interrupted network connection; and
restore accessibility from the application compute instance to the virtualized graphics device via the virtual network interface.

2. The system as recited in claim 1, wherein the routing device, the application compute instance, the virtualized graphics device and the network configuration manager are implemented as part of a provider network.

3. The system as recited in claim 1, wherein:
the routing metadata comprises a network address of the virtual network interface and a port number associated with the network address of the virtual network interface.

4. The system as recited in claim 3, wherein to re-establish accessibility the one or more computing devices are further configured to:
verify, using the routing metadata, that a particular packet received at the application compute instance originated at the virtualized graphics device.

5. The system as recited in claim 3, wherein to re-establish accessibility the one or more computing devices are further configured to:
verify, using the routing metadata, that a particular packet received at the virtualized graphics device originated at the application compute instance.

6. The system as recited in claim 3, wherein the one or more computing devices are further configured to:
determine that another virtualized graphics device is to be configured for network access from the application compute instance;
determine, from a range of port numbers associated with the network address of the virtual network interface, another port number which is unused;
generate other routing metadata, comprising the network address of the virtual network interface and the other port number, indicating that the virtual network interface is to be used to identify a route from the application compute instance to the other virtualized graphics device; and
establish accessibility from the application compute instance to the other virtualized graphics device via the virtual network interface based at least in part on the other routing metadata.

7. The system as recited in claim 3, wherein the one or more computing devices are further configured to:

responsive to a determining that communication between the application compute instance and the other virtualized graphics device is to be discontinued:
update the data structure representing the range of source port numbers to indicate that the second port number is no longer in use; and
utilize the second port number for routing network packets between a different application compute instance and a different virtualized graphics device.

8. A method, comprising:
performing, by one or more computing devices;
re-establishing network accessibility, responsive to an interruption of a network connection, between a virtualized graphics device and an application compute instance via a virtual network interface of a routing device based at least in part on routing metadata, wherein:
the network connection comprises a first network connection between the application compute instance and the virtual network interface of the routing device and a second network connection between the virtual network interface of the routing device and the virtualized graphics device;
the routing metadata indicates that the virtual network interface is to be used to identify a route from the application compute instance to the virtualized graphics device;
the interruption of the network connection comprises an interruption of either the first network connection or the second network connection; and
the re-establishing accessibility comprises:
restoring the interrupted network connection; and
restoring accessibility from the application compute instance to the virtualized graphics device via the virtual network interface.

9. The method as recited in claim 8, wherein the routing device, the application compute instance, the virtualized graphics device and the network configuration manager are implemented as part of a provider network.

10. The method as recited in claim 8, wherein:
the routing metadata comprises a network address of the virtual network interface and a port number associated with the network address of the virtual network interface.

11. The method as recited in claim 8, wherein the re-establishing accessibility further comprises:
verifying, by the application compute instance using the routing metadata, that a particular packet received at the application compute instance originated at the virtualized graphics device.

12. The method as recited in claim 8, further comprising:
determining that another virtualized graphics device is to be configured for network access from the application compute instance;
determining, from a range of port numbers associated with the network address of the virtual network interface, another port number which is unused;
generating other routing metadata, comprising the network address of the virtual network interface and the other port number, indicating that the virtual network interface is to be used to identify a route from the application compute instance to the other virtualized graphics device; and
establishing accessibility from the application compute instance to the other virtualized graphics device via the virtual network interface based at least in part on the other routing metadata.

13. The method as recited in claim 12, further comprising:
responsive to a determining that communication between the application compute instance and the other virtualized graphics device is to be discontinued:
- updating the data structure representing the range of source port numbers to indicate that the second port number is no longer in use; and
- utilizing the second port number for routing network packets between a different application compute instance and a different virtualized graphics device.

14. A non-transitory computer-accessible storage medium storing program instructions that when executed on one or more processors cause the one or more processors to perform:
re-establishing network accessibility, responsive to an interruption of a network connection, between a virtualized graphics device and an application compute instance via a virtual network interface of a routing device based at least in part on routing metadata, wherein:
- the network connection comprises a first network connection between the application compute instance and the virtual network interface of the routing device and a second network connection between the virtual network interface of the routing device and the virtualized graphics device;
- the routing metadata indicates that the virtual network interface is to be used to identify a route from the application compute instance to the virtualized graphics device;
- the interruption of the network connection comprises an interruption of either the first network connection or the second network connection; and
- the re-establishing accessibility comprises:
  - restoring the interrupted network connection; and
  - restoring accessibility from the application compute instance to the virtualized graphics device via the virtual network interface.

15. The non-transitory computer-accessible storage medium as recited in claim 14, wherein the routing device, the application compute instance, the virtualized graphics device and the network configuration manager are implemented as part of a provider network.

16. The non-transitory computer-accessible storage medium as recited in claim 15, wherein:
the routing metadata comprises a network address of the virtual network interface and a port number associated with the network address of the virtual network interface.

17. The non-transitory computer-accessible storage medium as recited in claim 14, wherein the re-establishing accessibility further comprises:
verifying, by the virtualized graphics device using the routing metadata, that a particular packet received at the virtualized graphics device originated at the application compute instance.

18. The non-transitory computer-accessible storage medium as recited in claim 14, wherein the re-establishing accessibility further comprises:
verifying, by the virtualized graphics device using the routing metadata, that a particular packet received at the virtualized graphics device originated at the application compute instance.

19. The non-transitory computer-accessible storage medium as recited in claim 18, the program instructions that when executed on or across one or more processors further cause the one or more processors to perform:
- determining that another virtualized graphics device is to be configured for network access from the application compute instance;
- determining, from a range of port numbers associated with the network address of the virtual network interface, another port number which is unused;
- generating other routing metadata, comprising the network address of the virtual network interface and the other port number, indicating that the virtual network interface is to be used to identify a route from the application compute instance to the other virtualized graphics device; and
- establishing accessibility from the application compute instance to the other virtualized graphics device via the virtual network interface based at least in part on the other routing metadata.

* * * * *